US007742348B2

(12) United States Patent
Schuessler

(10) Patent No.: US 7,742,348 B2
(45) Date of Patent: Jun. 22, 2010

(54) CONCATENATED POINTERS FOR RADIO FREQUENCY IDENTIFICATION TAGS

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 506 days.

(21) Appl. No.: 11/835,335

(22) Filed: Aug. 7, 2007

(65) Prior Publication Data

US 2008/0129506 A1    Jun. 5, 2008

Related U.S. Application Data

(60) Provisional application No. 60/835,866, filed on Aug. 7, 2006.

(51) Int. Cl.
*G11C 7/00* (2006.01)
(52) U.S. Cl. ................. 365/192; 340/10.1; 340/815.78; 340/572.7; 365/191
(58) Field of Classification Search ................. 365/104, 365/192; 340/2.1–2.8, 10.1–10.6, 10.5, 10.51, 340/572.1–572.9; 700/215, 221, 225, 227; 726/20; 235/375–385, 492; 455/150.1, 151.1
See application file for complete search history.

(56) References Cited

U.S. PATENT DOCUMENTS

| 6,130,602 | A | * | 10/2000 | O'Toole et al. | .......... 340/10.33 |
| 6,734,797 | B2 | | 5/2004 | Shanks et al. | |
| 2007/0096919 | A1 | | 5/2007 | Knadle, Jr. et al. | |
| 2008/0034183 | A1 | | 2/2008 | Drago et al. | |

* cited by examiner

*Primary Examiner*—Richard Elms
*Assistant Examiner*—Harry W Byrne
(74) *Attorney, Agent, or Firm*—Glenn Frankenberger

(57) ABSTRACT

Methods and systems are provided for improved protection of radio frequency identification tag memory by using two or more "brownout-safe" pointer registers (instead of a single pointer register) that are logically concatenated to form a complete address for the boundary between a locked portion and an unlocked portion of the tag memory. A first pointer is a coarse pointer identifying a block of memory containing the boundary. A second pointer is a fine pointer identifying a specific location within the identified coarse block of memory. The coarse pointer may be a gray-coded or linear pointer. Similarly, the fine pointer may be a gray-coded or linear pointer.

8 Claims, 11 Drawing Sheets

CONCATENATED POINTERS FOR RADIO FREQUENCY IDENTIFICATION TAGS

CROSS-REFERENCE TO RELATED APPLICATIONS

This application claims benefit of U.S. Provisional Patent Appl. No. 60/835,866, filed on Aug. 7, 2006, which is incorporated by reference herein in its entirety.

FIELD OF THE INVENTION

The present invention relates to managing memory in a radio frequency identification tag.

BACKGROUND OF THE INVENTION

Radio frequency identification (RFID) tags, especially passive tags, can suffer momentary power loss during write operations resulting in incomplete execution of the write. If the loss of power occurs during a write of new identification or other data, the problem can be detected and corrected by rewriting the data at a later time. However, if instead the loss of power occurs during an update to a stored memory pointer, the pointer can be corrupted and may point to a random address. The corruption problem is particularly severe if the pointer is used to indicate one or more regions of locked (read and/or write) or permanently-locked memory. The term "locked" is typically used to indicated read or write permission, temporarily or for the life of the tag (known as "permalocking").

An expected typical mode of operation on tag user memory is for an interrogator to write a new data item to the lowest available unlocked memory address and then to lock the region of memory containing the new data. In typical applications, a single address pointer is utilized to indicate the current boundary between locked and unlocked memory. Such traditional pointers are sometimes call "log" pointers, because they achieve a range of "n" addresses using only $\log_2(n)$ bits (e.g., an 8 bit pointer handles up to 256 addresses). A limitation of the use of traditional "log" points is that an arbitrary number of bits may change when an address changes. A "brownout" that prevents completion of the pointer update could result, for example, in un-locking memory that had previously been protected against accidental or malicious rewrites. This traditional approach is commonly used. For example, the ISO/IEC 15962:2004 standard describes the use of an increment-only pointer for the ISO/IEC 18000-3 Mode 2, for the 13.54 mHz RFID air interface.

Two techniques have been proposed to mitigate the problems potentially cause by "brownouts" or similar situations. One technique uses a non-traditional Gray-Coded address pointer. The advantage of incrementing addresses using a Gray code is that only one bit changes every time the pointer is incremented. Thus, changing an address by repeatedly incrementing it by one value will guarantee that the result, after a brownout, is either correct, or at worst, one less than the correct value. For additional details of the Gray-code technique, see U.S. patent application Ser. No. 11/835,201, entitled "Protecting Critical Pointer Value Updates To Non-Volatile Memory Under Marginal Write Conditions," which is incorporated herein by reference in its entirety.

A disadvantage of the Gray-code technique, compared to the traditional log pointer approach, is that to change the address by "n" locations, "n" separate successive write cycles are required. This approach, when large address changes are involved, may be slow, reducing processing throughput. Additionally, the approach may increase the probability that the tag will lose power before the full update is completed and may shorten the life of the tag which has a maximum guaranteed number of write cycles.

A second technique uses a "bitmap" instead of a standard address pointer to indicate which "blocks" of memory are permanently locked. For example, each '1' bit in the bitmap indicates a locked block. This approach is sometimes referred to as a "linear" pointer. Because the individual bits each control a separate block, no logical dependencies exist between the bits. Therefore, changing protection on one block changes only one bit, with no effect on the other bits. Moreover, in a "permalocking" application of the memory pointers, new blocks are allowed to "protected," but previously-protected blocks are by definition not allowed to become "unprotected." Therefore, the tag is only allowed to set bits to '1' within the bitmap, never to '0.' Thus, a "brownout" may result in incomplete protection, but will not result in lost protection.

A disadvantage to this approach is that it forces a tag vendor, as user memory size increases, to choose between a very large "bitmap" and a smaller "bitmap" where each bit represents a larger block of addresses. Choosing a large block size incurs the penalty that, as each new data item is written (then locked), a significant portion of the last bytes of each last-written block will be wasted.

A log-linear hybrid approach uses a linear pointer to protect blocks of memory coupled to a log pointer for each block to provide fine-grained protection within each block. Because the secondary pointers are traditional "log" pointers, they are also susceptible to the "brownouts" described above.

What is therefore needed is a method and system to ensure that previously locked data is not accidentally unlocked due to power loss.

What is further needed are methods and systems to minimize wasted nonvolatile memory when multiple items are written then locked over time.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
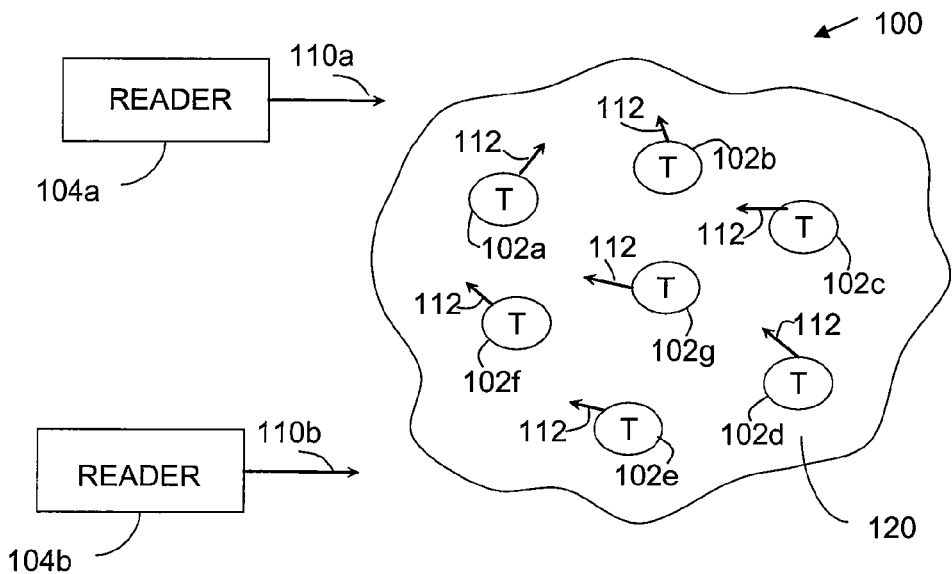
FIG. 1 illustrates an environment where interrogators communicate with an exemplary population of RFID tags.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Exemplary Operating Environment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
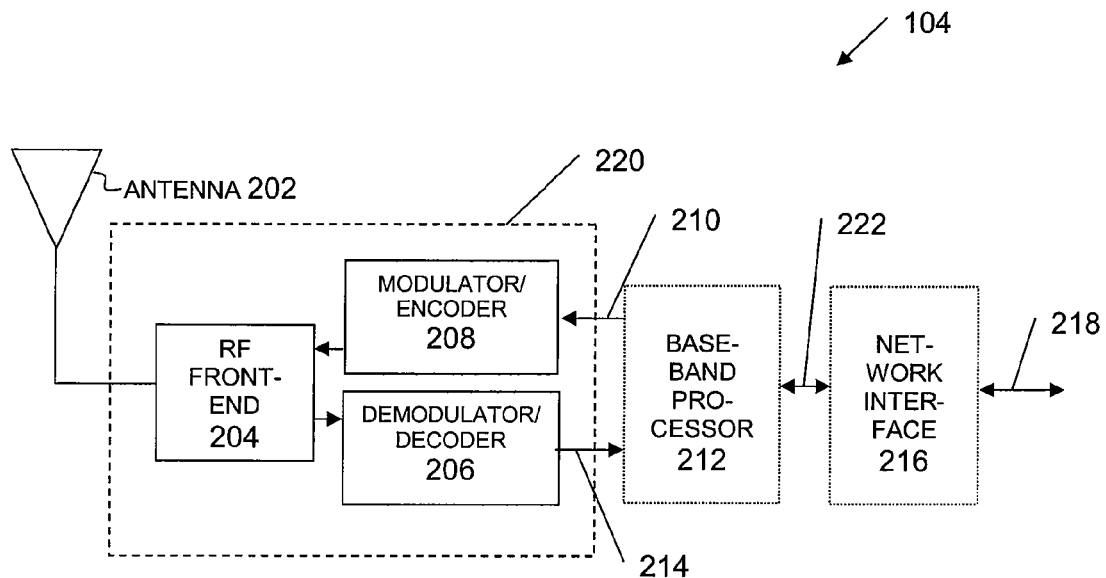
FIG. 2 shows a block diagram of an example RFID interrogator.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
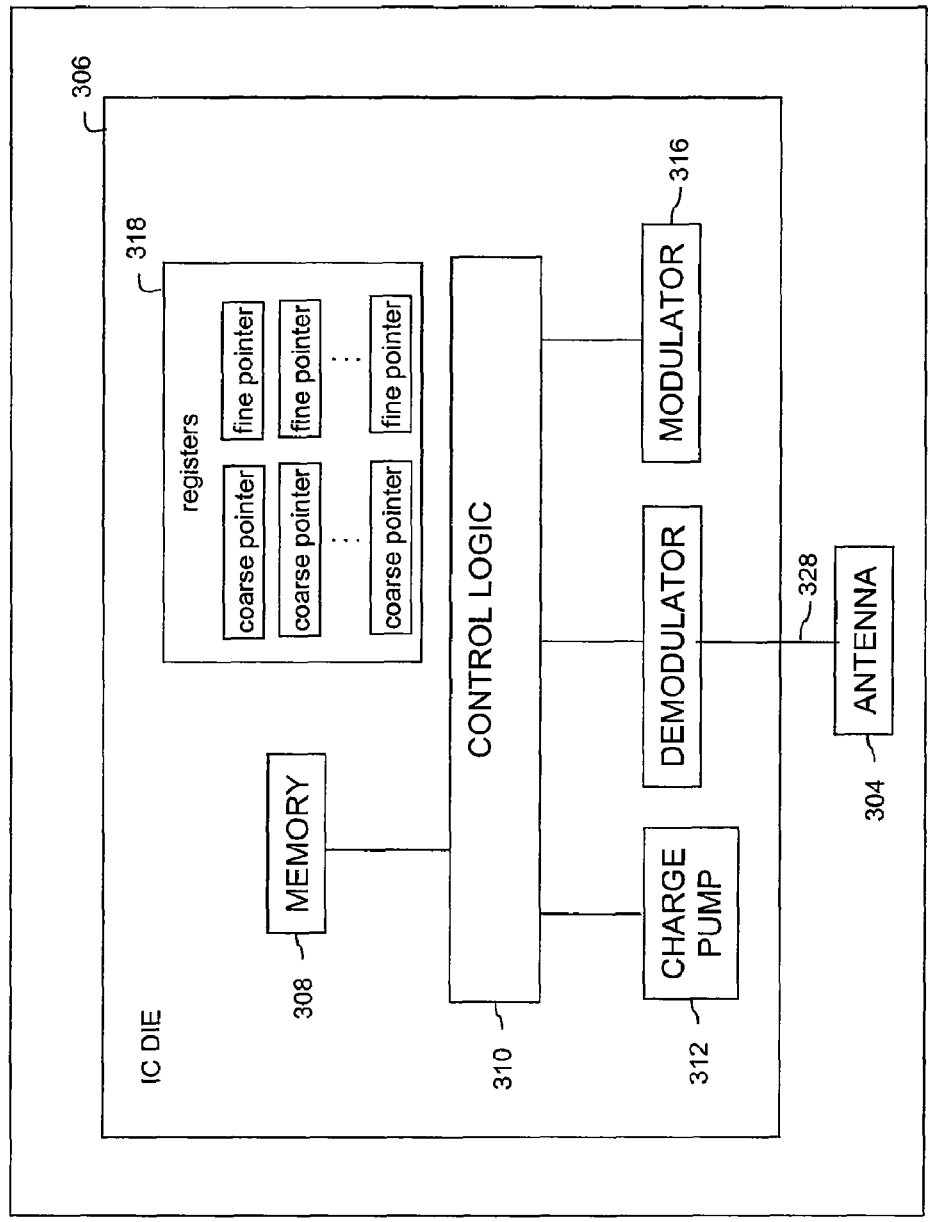
FIG. 3 shows a plan view of an exemplary radio frequency identification (RFID) tag, according to embodiments of the present invention.

The present invention is applicable to any type of RFID tag. FIG. 3 shows a plan view of an exemplary radio frequency identification (RFID) tag 102, according to embodiments of the present invention. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304.

In the example of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 is used to power circuits of IC die 306, including control logic 320.

Charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Tag 102 also includes a plurality of pointer registers 318. Pointer registers 318 may store one or more coarse pointers and one or more fine pointers. Coarse pointers and/or fine pointers are described in detail below in Sections 2 and 3. Additionally, coarse pointers and/or fine pointers may optionally be associated with a tag memory bank of memory 308.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Figure 4:
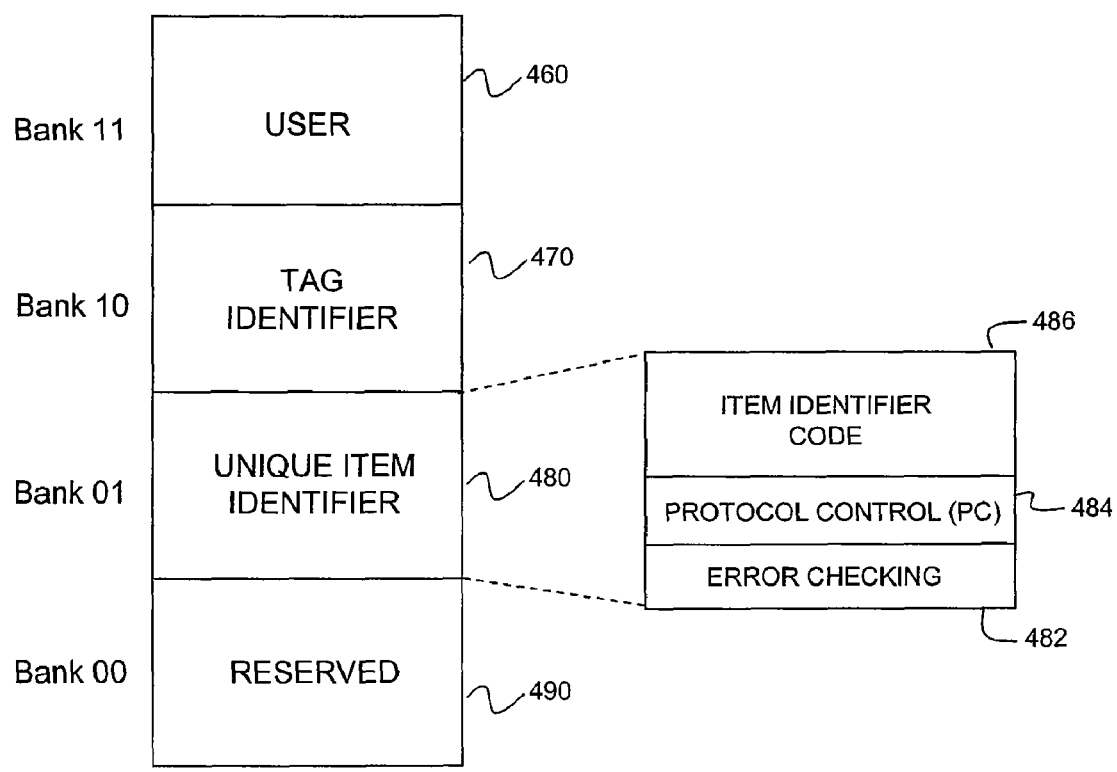
FIG. 4 depicts an exemplary logical memory map for a Gen-2 tag memory.

In a Gen-2 tag, tag memory 308 may be logically separated into four memory banks. FIG. 4 depicts an exemplary logical memory map 400 for a Gen-2 tag memory 308. Tag logical memory 400 includes a user memory bank 460 (bank 11), a tag identifier bank 470 (bank 10), a unique item identifier bank 480 (bank 01), and a reserved bank 490 (bank 00). Each bank may have any number of memory words. Additionally, the format of one or more memory banks may be established by an industry, governmental, standards, or other similar type of organization.

User memory bank 460 is configured for user-specific data storage. Tag identifier (TID) bank 470 is configured to store identification information for a tag. For example, TID bank 470 may store an allocation class identifier for the tag and information regarding the unique commands and/or optional features supported by the tag. User Item Identifier (UII) bank 480 is configured to store an error checking code 482 (e.g., a CRC-16), protocol control (PC) bits 484, and an item identifier code 486. Item identifier code 486 may identify the object to which the tag is attached. Reserved bank 490 is configured to store the kill and access passwords for a tag.

2. Overview

Embodiments of the present invention provide an improved protection method over existing techniques by using two or more "brownout-safe" pointer registers (instead of a single pointer register) that are logically concatenated to form the complete address. This approach is effective against brownouts, because power loss during calculations (such as concatenating the two addresses) has no negative long-term effect so long as the corrupted calculations are not stored in nonvolatile memory.

2.1 Concatenated Pointer

A boundary pointer is used to identify a boundary between locked and unlocked portions of a tag memory. In embodiments of the present invention, the boundary pointer includes a coarse pointer and a fine pointer. The coarse pointer identifies a block of memory containing the boundary. The fine pointer identifies a specific location of the lock/unlock boundary within the memory block identified by the coarse pointer. The coarse pointer may be a gray-coded pointer. Alternatively, the coarse pointer may be a linear (bitmap) pointer. The fine pointer can be implemented in various ways, regardless of the implementation of the coarse pointer. For example, the fine pointer may be a gray-coded pointer or may be a linear "bitmap" pointer.

As discussed above, a prior technique for identifying the address of a lock/unlock boundary involves the use of an n-bit gray-coded boundary pointer. In embodiments of the present invention, the base pointer may be split into a c-bit coarse gray-code pointer and an f-bit fine gray-code pointer (where c+f=n). The use of the coarse/fine gray-code boundary pointer reduces the number of writes to update the base pointer (in the worst case) from c*f, in the prior technique, to c+f.

In an alternate prior technique, the boundary pointer was represented as a "bitmap" of large blocks of memory. This representation inherently serves as a "coarse" pointer to locked/unlocked memory. Embodiments of the present invention concatenate a second fine pointer to the coarse pointer. The fine pointer enables the safe locking of a selectable portion of a block of written data. Because the entire memory block does not have to be locked, the use of a fine pointer avoids wasting words of memory. In this scenario, fine granularity is achieved at the locked/unlocked boundary with a modest increase in the number of bits required to store the fine pointer.

For example, a tag with 8K bits of memory (512 words) could be implemented logically as having 16 blocks of 32 words each. In the prior technique, if a 16-bit base linear (bitmap) pointer is used as the boundary pointer, the granularity for the lock/unlock boundary is exceedingly coarse. Up to 31 words in a block could be wasted at the end of each locked block. To provide optimal (2-byte) granularity in a single linear boundary pointer, a 512-bit linear pointer would be required.

In embodiments of the present invention, the 16-bit linear block pointer could be concatenated with a 5-bit Gray-coded fine pointer. A Gray pointer of that size provides word-level addressability within the final 32-word block. The resulting coarse/fine boundary pointer pair has a total of 21 pointer bits (16-bits for the coarse pointer, 5-bits for the fine pointer) instead of 512 bits for the single linear base pointer. Alternatively, the fine pointer could be implemented as a second linear pointer (32 bits long, one bit per word). The resulting coarse/fine boundary pointer has a total of 48 bits compared with the 512 bits for the single linear pointer.

In an embodiment, the coarse/fine pointers are defined as indicating word addresses. This definition matches the capabilities of RFID standards, such as ECPglobal Class-1 Generation-2 standards (Gen 2). As would be appreciated by persons of skill in the art, the pointers can be defined using other address increments such as byte, bit, or double-word.

The concatenated boundary pointer can be used with a variety of memory configurations. Section 2 describes exemplary memory configurations using one or more concatenated boundary pointers. As would be appreciated by persons of skill in the art, concatenated boundary pointers can be used to identify lock/unlock boundaries with any suitable memory configuration.

2.2 Lock Operation

A lock operation may result in reversible or permanent write and/or read locking of a portion of a tag's memory. To cause the tag to perform the lock operation, an interrogator issues either an explicit or an implicit lock command or commands. These commands cause tag 102 to update the appropriate coarse pointer and fine pointer. The explicit commands may be implemented as any combination of required, optional, and custom commands. Additionally, the following explicit commands may also include an identification of the tag memory bank whose pointer(s) are being updated.

In an embodiment, the lock command is a single explicit command including a single parameter. An exemplary single parameter lock command is illustrated below.

| LOCK | [memory bank] | parameter |
|------|---------------|-----------|

The single parameter may be an absolute address relative to the start of the memory bank. Alternatively, the single parameter may be represented as increments (or decrements) to the previously-stored boundary pointer. In embodiments in which a gray pointer is used, the value of the increment parameter corresponds directly to the number of write cycles needed to update each gray pointer. For pointers that are allowed to increment or decrement, the parameters can use signed values (e.g., where a leading '1' bit represents a negative number). Techniques for the use of sign bits would be well known to those skilled in the art. Upon receipt of this lock command, tag 102 converts the parameter to a coarse pointer and a fine pointer. The lock command may also include an optional indicator of a specific tag memory bank.

Alternatively, the lock command is a single explicit command including a coarse parameter and a fine parameter. The coarse parameter and fine parameter may each be represented as an absolute address relative to the start of the memory bank. Alternatively, the coarse and fine parameters may be represented as increments (or decrements) to the previously-stored coarse and fine pointers. Upon receipt of this lock command, tag 102 converts the coarse parameter to a coarse pointer and the fine parameter to a fine pointer. The lock command may also include an optional indicator of a specific tag memory bank.

| LOCK | [memory bank] | coarse parameter | fine parameter |
|------|---------------|------------------|----------------|

In a further embodiment, updates to the coarse pointer and fine pointer are controlled by separate commands. For example, coarse locking may be controlled by a standard air interface lock command and fine locking controlled by a custom air interface command. Examples of each command are illustrated below. The update parameter in each command may be represented as an absolute address or as an increment to the previously-stored pointer value. Additionally, each command may include an optional memory bank indication.

| COARSE LOCK | [memory bank] | update parameter |
|-------------|---------------|------------------|
| FINE LOCK | [memory bank] | update parameter |

In another embodiment, the pointer values are implicitly updated upon receipt of a write command from a reader. In this embodiment, the updates to the coarse and fine pointers are based on the addresses spanned by the received write command. The tag's internal logic can be enhanced to automatically implement the correct coarse and fine pointer increments, based on an enhanced command that writes new data to memory, and in the same command automatically locks (read and/or write lock, reversible or permanent) all memory up to the highest address that was just written. Note that ISO/IEC 15962 describes a somewhat related functionality: the add-object command includes a "lock" parameter, which if set causes the tag driver to reformat the data to be written as necessary so that the object, when written to tag memory, is entirely within block boundaries that were unlocked, but that can be locked after writing the object. However, this reformatting is performed in the reader, and the tag logic is not involved. In contrast, in this embodiment of the current invention, a single write-with-lock air interface command causes the tag logic to lock the blocks just written to, and then to update the locked/unlocked boundary accordingly.

A command for reading the current state of the lock/unlock boundary (or boundaries) or the state of the coarse pointer and/or fine pointer may also be provided. This command is not required as a lock/unlock boundary can be inferred from tag error responses when attempting to access protected locations

3.0 Exemplary Configurations

3.1 Single Lock/Unlock Boundary—Contiguous Locking

3.1.1 Memory Configuration

Figure 5:
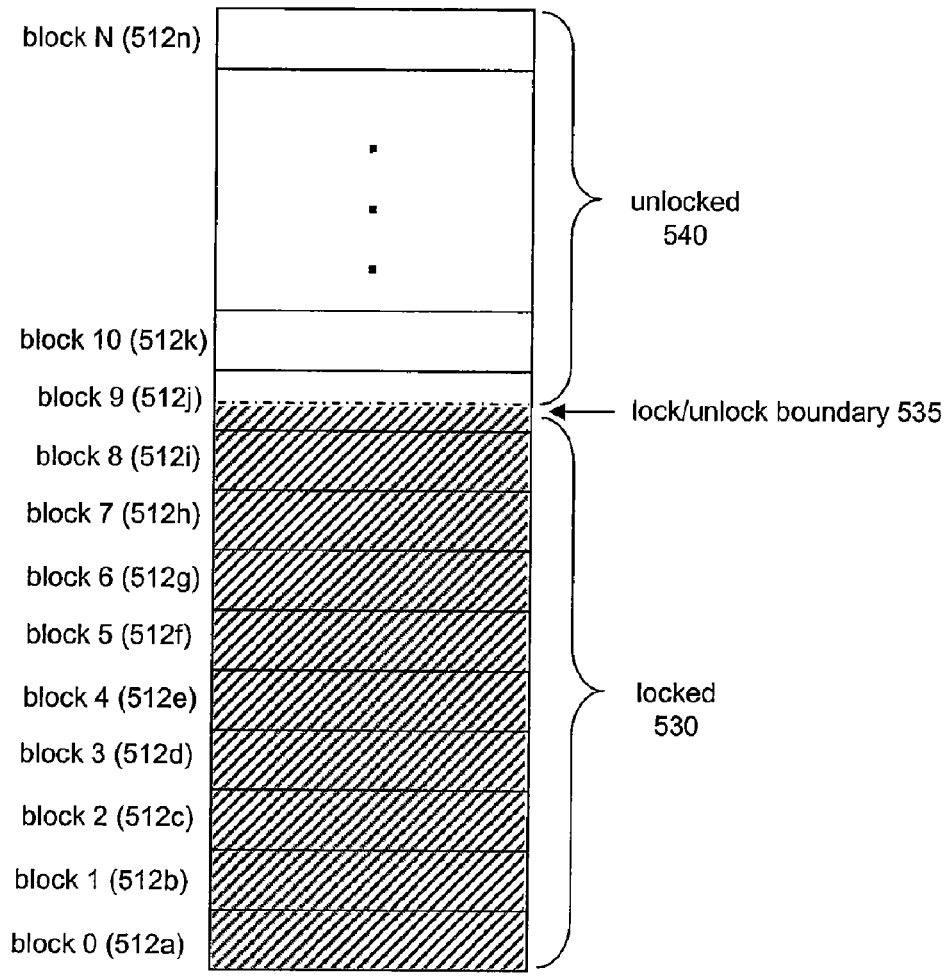
FIG. 5 depicts an exemplary configuration of a tag memory bank having a single lock/unlock boundary, according to embodiments of the present invention.
Figure 5:
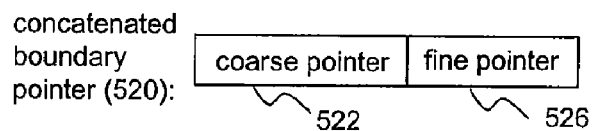
Figure 5:
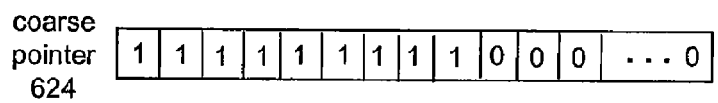
Figure 5:
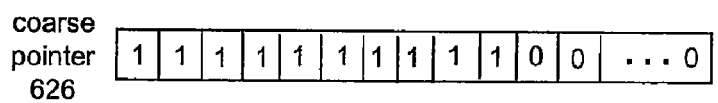

FIG. 5 depicts an exemplary configuration of a tag memory bank 500 having a single lock/unlock boundary, according to embodiments of the present invention. Data can be written to a tag memory bank at various stages during the life of the tag. FIG. 5 depicts a configuration in which data is written to the lowest memory address that is currently available. This is commonly referred to as "upward growing." A data item written to tag memory can be locked at some time after it has been written. Alternatively, several data items can be written at various times to unlocked memory and then locked at the same time.

Tag memory bank 500 is logically divided into N blocks 512a-n. Each block 512 has a predetermined number of words (or bytes). As depicted in FIG. 5, memory bank 500 includes a single lock/unlock boundary 535. All memory below lock/unlock boundary 535 is locked (referred to as "locked" section 530). The memory in locked section 530 is locked contiguously. That is, there are no unlocked portions of memory within locked section 530. All memory above the lock/unlock boundary 535 is unlocked (referred to as "unlocked" section 540).

The position of the lock/unlock boundary 535 in tag memory bank 500 is indicated by concatenated boundary pointer 520 having a coarse pointer 522 and a fine pointer 526. In an embodiment, the default position of the lock/unlock boundary 535 of an unprogrammed tag is set at offset zero from the start of the bank.

In an embodiment, the single locked/unlock boundary is managed by a coarse gray-coded pointer 522 and a fine gray-coded pointer 526. In another embodiment, coarse pointer 522 is a linear (bitmap) pointer (a "bitmap" indicating the locked/unlocked status of each "block" within the memory bank) in combination with a fine pointer 526 that provides the ability to lock fewer than all of the memory words in one of the blocks managed by the coarse pointer. The fine pointer 526 in this embodiment could be Gray-Coded, or could be linear (linear requires more bits, but large increments to a linear pointer execute somewhat faster than the Gray-Coded equivalent). The description of this embodiment will use a Gray Coded fine pointer, but a linear fine pointer could be substituted without a substantial change to the description.

In an embodiment, the linear (bitmap) pointer is ordered such that the leftmost (most-significant) bit corresponds to the first (lowest address value) memory block in the bank, and within the linear pointer, each '1' bit indicates a locked blocked. As would be appreciated by persons of skill in the art, alternate conventions could be used with the present invention.

In an embodiment, the "coarse boundary" of the upward-moving locked/unlocked boundary 535 is considered to be the first (lowest) un-locked block above the last (highest) block that is completely locked (as indicated by a '1' bit in the linear coarse pointer). This embodiment is illustrated as coarse pointer 524 in FIG. 5, When only a single boundary is implemented, then the coarse boundary is therefore represented in the linear coarse pointer as the '0' bit that is immediately to the right of the rightmost '1' bit in the pointer. This first unlocked block's address is the base address that the fine pointer is added to, as described above, to form the full address of the first un-locked word of memory above the boundary.

In this embodiment, an Interrogator using only the coarse pointer (possibly because it is unaware of the tag's additional fine-pointer functionality) achieves the intended results, simply by ignoring the fine pointer (thus leaving it at its default value of zero) and manipulating the coarse pointer to indicate which blocks are to be completely locked. The corollary is that an Interrogator, if it wishes to use the fine pointer to partially-lock the highest memory block, should set the coarse pointer to lock all required blocks except the final (highest) one to be locked, and set the fine pointer to indicate the first unlocked word of the highest block. Of note when implementing a perma-lock pointer, this convention assures that an Interrogator can increment the fine pointer, but never has to decrement the fine pointer. As noted above, many different command formats can achieve this result, or alternatively this locking logic can be built into the tag itself.

In an alternative embodiment, the "coarse boundary" is considered to be the last (highest) block that is completely or partially locked (as indicated by the rightmost '1' bit in the linear coarse pointer), rather than the first (lowest) un-locked block above the last (highest) block that is completely locked. In this alternative, therefore, the fine pointer is based at highest block address that is shown to be locked by the coarse bitmap pointer, rather than at the first unlocked block address above it. Put another way, the difference between these two conventions is whether the partially-locked block (under the control of the fine pointer) is represented by a '0' or a '1' in the coarse pointer. The first embodiment uses a '0' to represent the partially-locked block, while the alternate embodiment uses a '1'. An advantage of this alternative embodiment is that the coarse pointer manipulations are identical, whether or not the Interrogator is aware of the fine pointer facility. An interrogator that is unaware of a tag's fine-pointer facility will simply assume that every block with a corresponding '1' in the bitmap is completely locked (and assume that every block with a '0' is completely unlocked), and this is a desirable outcome for that circumstance.

Note that, if tag compatibility is to be maintained with all interrogators (whether aware of the fine-pointer enhancement or not), then the default state of the fine pointer needs to be such that all of the words of the block on which it is based must be fully locked by default (and as a corollary, when using the standard command that modifies the bitmap to lock a new block, that new block will always be completely locked). However, it would undesirable if Interrogators manipulating the fine pointer would need to be able to roll back the fine pointer in order to achieve partial-locking of the boundary block, which would necessarily imply that Interrogators will need to have the ability to unlock previously-locked words within the boundary block, even in a perma-lock application. Instead, accidental or malicious exposure of previously-locked words within the highest block can be prevented, by defining the command set such that the fine pointer can only be incremented (never rolled back), except when the fine-pointer change is part of the same command that increments the coarse pointer. This implies that the tag, if designed to this alternative embodiment, needs to support two ways of modifying the coarse bitmap pointer (via the standard command that fully-locks every locked block, and via a command that also sets the fine pointer to the desired offset for partially-locking the last block).

As can be seen from the above paragraph, both embodiments have advantages and disadvantages. An embodiment may be selected by a tag designer, based on the needs of the application, ease of implementation, and the details of the governing standards. Throughout the remainder of this disclosure, for ease of description, the first embodiment is used (e.g., the upward-moving boundary's fine pointer will be based at the first unlocked block above the highest coarse-locked block, rather than at the highest coarse-locked block). However, one skilled in the art could make the necessary adjustments to use the alternate convention without departing from the spirit of the invention.

3.1.2 Lock Operations

Figure 6:
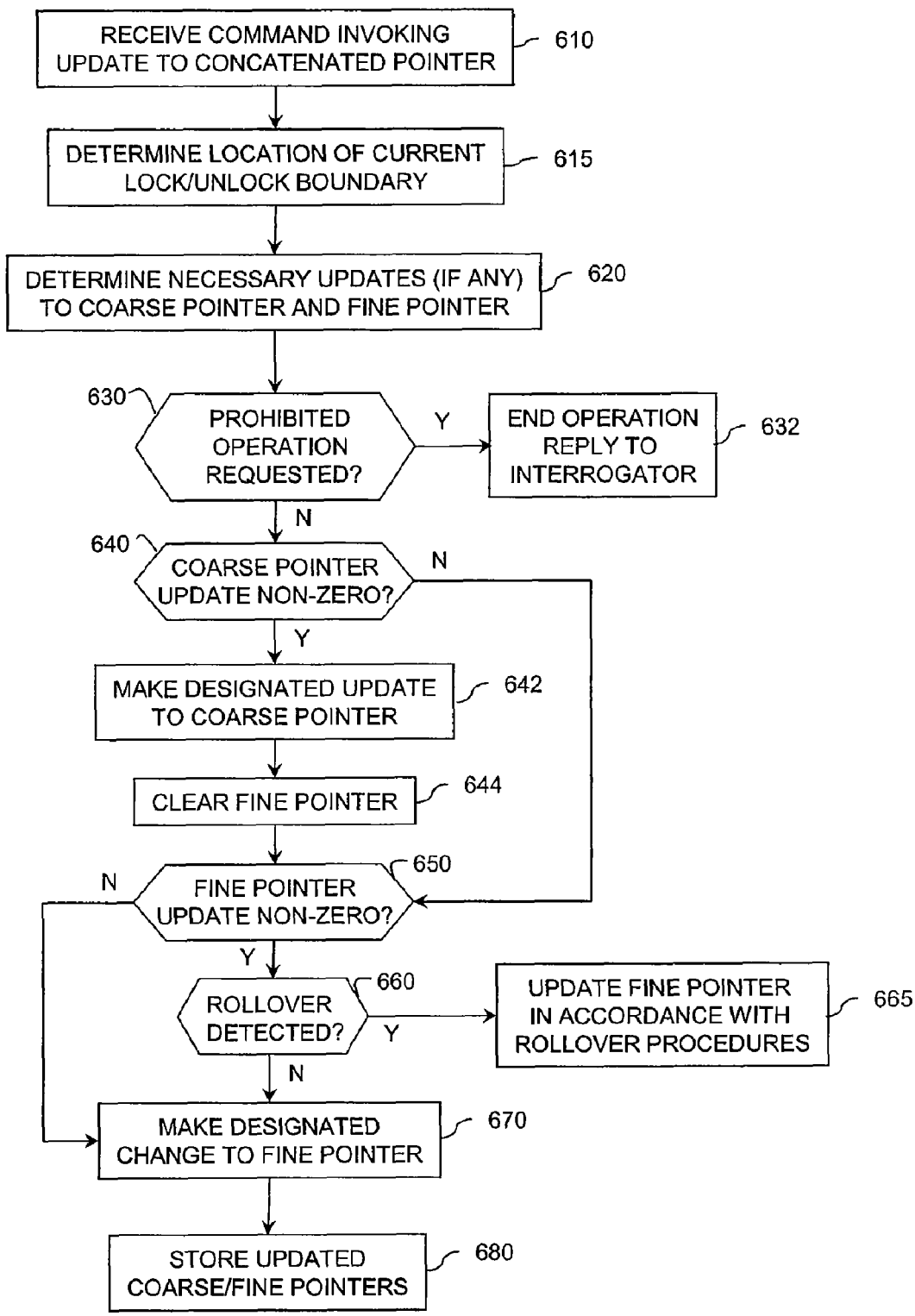
FIG. 6 depicts a flowchart of an exemplary method for updating a coarse pointer and a fine pointer in a memory configuration with a single lock/unlock boundary and having contiguously locked memory blocks from the perspective of an RFID tag, according to embodiments of the present invention.

FIG. 6 depicts a flowchart 600 of an exemplary method for updating a coarse pointer and a fine pointer in a memory configuration with a single lock/unlock boundary and having contiguously locked memory blocks from the perspective of RFID tag 102, according to embodiments of the present invention. Flowchart 600 is described with continued reference to the embodiments depicted in FIGS. 1 and 5. However, flowchart 600 is not limited to those embodiments. Note that some of the steps in flowchart 600 do not necessarily have to occur in the order shown.

Flowchart 600 can be used in embodiments having a gray-coded coarse pointer or a linear coarse pointer. The most significant difference between these embodiments is that in the gray-coded coarse pointer embodiment the locked/unlocked boundary address is explicitly defined by the boundary pointer-pair; in contrast, in the linear (bitmap) coarse pointer embodiment, the boundary address must be determined, by the tag's logic, from the state of the "bitmap."

Prior to step 610, tag 102 may determine whether the fine pointer feature is enabled. This determination may be based on a number of factors. For example, if the coarse pointer indicates that no blocks are locked, then the fine pointer feature is enabled. In addition or alternatively, if all of the locked blocks (e.g., those blocks represented by '1' bits in the linear bitmap) are contiguous, starting from the first block of the memory bank, then the fine pointer feature is enabled.

In step 610, tag 102 receives a command invoking an update to the concatenated boundary pointer of tag 102. As described above, the command may be one or more explicit lock commands or may be write command invoking an implicit pointer update.

In step 615, tag 102 determines the location of current lock/unlock boundary. In the gray-coded embodiment, the value of the gray-coded coarse pointer is the correct base address to which the fine pointer value is added. For a linear coarse pointer, tag 102 analyzes the current linear bitmap pointer and current value of the fine pointer (as both exist before the new lock or write-and-lock command).

To determine the value of the current linear bitmap pointer, in an embodiment, tag 102 cycles the coarse pointer bits through a shift register (starting with the left most bit, which represents the first (lowest) memory block). The logic could increment a traditional or Gray-Coded address pointer each time a '1' bit is encountered in the linear pointer, stopping when the first '0' bit is encountered. The address pointer would at that point contain the correct base address to which the fine pointer is added.

Under particular restricted conditions such as where there is only a single lock/unlock boundary per bank, and where all locked blocks are contiguous and start from the lowest block of the bank, equivalent results are obtained by shifting through the bits, starting from the rightmost (highest) bit, decrementing the boundary address for each '0' encountered, then stopping (and incrementing the address by one) after the first '1' bit is encountered.

In step 620, tag 102 determines the update for coarse pointer 522 and fine pointer 526.

In step 630, a determination is made whether the command requests a prohibited lock operation. For example, if the received command requests a permanent change that would lower a previously set boundary, the lock operation is prohibited. Tag 102 must reject a permanent lock command that attempts to lower a previously-set permanently locked boundary because this action would have the effect of unlocking previously-locked data. Only increments of the boundary are allowed in this circumstance. If the command is for a prohibited lock operation, operation proceeds to step 632. If the command is not for a prohibited lock operation, operation proceeds to step 640.

In step 632, lock operation processing ends and the appropriate response is returned to interrogator 104.

In step 640, a determination is made whether the coarse pointer update increment is non-zero. If the coarse pointer update is non-zero, operation proceeds to step 642. If the coarse pointer update is zero, operation proceeds to step 650. In an embodiment, tag 102 calculates and stores, as a temporary variable, the original coarse boundary address. Then, tag 102 creates a modified coarse pointer by adding bits per the requested change and calculates the new boundary address.

As noted above, the locked/unlocked boundary for a permanent-lock pointer can never be allowed to decrement. Yet, when the boundary increment (locking more memory) causes the coarse pointer to increment, it may well be that the fine pointer needs to be set to a lower value than before. This could be problematic in implementations where the coarse (linear) pointer and the fine pointer are controlled via separate commands (which may be the case, for example, if only coarse locking is controlled by a standard air interface command, with fine control added by a custom command). The solution is for the tag's logic to first increment the coarse pointer, automatically resetting the fine pointer to zero when it does so. Then, the fine pointer can be incremented as needed. The fact that the tag's internal logic controls this reset, which occurs only when the coarse boundary moves, ensures that an inadvertent or malicious command cannot manipulate the fine pointer downward to expose previously-locked memory.

In step 642, the designated change to the coarse pointer is made.

In step 644, the fine pointer value is cleared (set to zero).

As would be appreciated by persons of skill in the art, step 642 and step 644 could be performed in the reverse order. However, there are disadvantages to reversing the order. If a power loss occurs during or immediately after clearing the fine pointer, then some previously-protected memory could inadvertently become exposed. However, when performed in the recommended order, if a power loss occurs while updating the coarse pointer, no long-term harm is caused. After power is reapplied, the fine pointer may erroneously contain the prior value (instead of being reset to zero), but this will be automatically corrected when the Interrogator reads back the result, sees that the coarse pointer has not yet been fully updated, and issues another command to complete the operation. The worst case is if the power loss occurs exactly at the time that the coarse pointer has been fully updated, but the fine pointer has not yet been cleared. Even in this worst case, the only negative effect is that some bytes of memory are accidentally locked, which is a less severe consequence than accidentally exposing memory that should be locked.

In step 650, a determination is made whether the fine pointer update increment is non-zero. If the fine pointer update is non-zero, operation proceeds to step 660. If the fine pointer update is zero, operation proceeds to step 670.

In step 660, a determination is made whether the required change to the fine pointer will cause the value of the fine pointer to exceed a maximum values (referred to as a "rollover"). If a rollover condition is detected, operation proceeds to step 665. If a rollover condition is not detection, operation proceeds to step 670.

In step 665, the fine pointer is updated in accordance with a specified rollover procedure. Operation proceeds to step 680.

In an embodiment, the Interrogator may be responsible for handling rollover situations by commanding the appropriate changes to both the coarse and fine pointers. In that embodiment, tag 102 freezes the increment operation if the fine pointer's maximum value is reached.

In an alternate embodiment, tag 102 is responsible for handling rollover. In this embodiment, tag 102 first "tests" the sum of the fine pointer's current value and its requested increment. Tag 102 then performs an additional single increment of the coarse pointer if rollover will occur.

In step 670, the designated update to the fine pointer is made.

In step 680, the coarse pointer and fine pointer are stored in separate pointer registers.

3.2 Single Lock/Unlock Boundary—Non-Contiguous Locking

3.2.1 Memory Configuration

Figure 7:
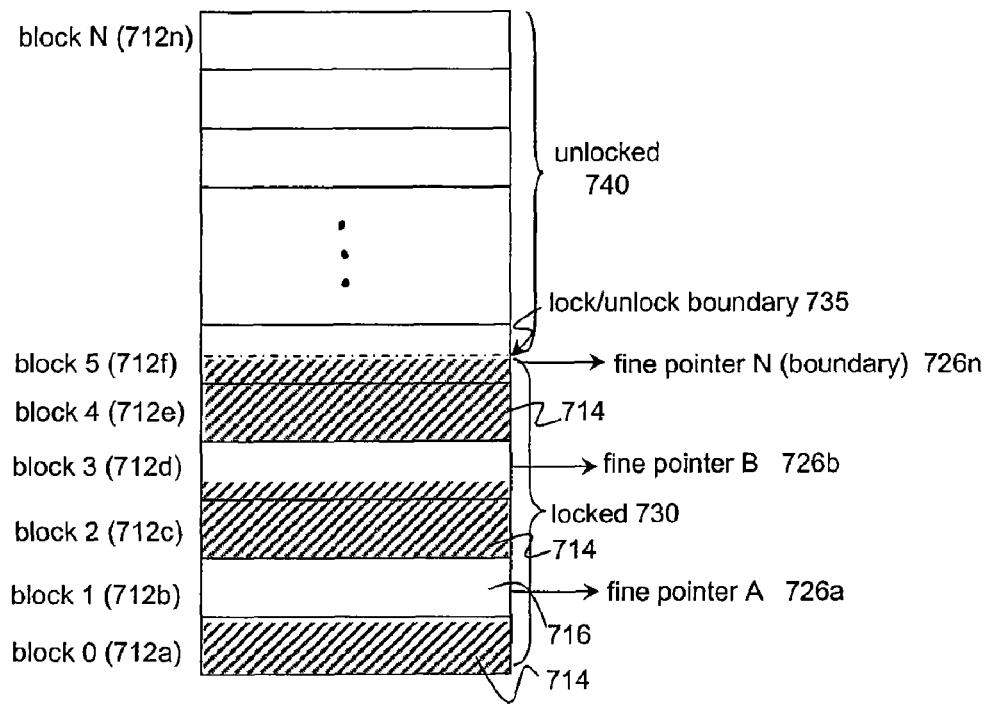
FIG. 7 depicts an exemplary configuration of a tag memory bank having a single lock/unlock boundary and non-contiguous locking within the locked portion, according to embodiments of the present invention.
Figure 7:
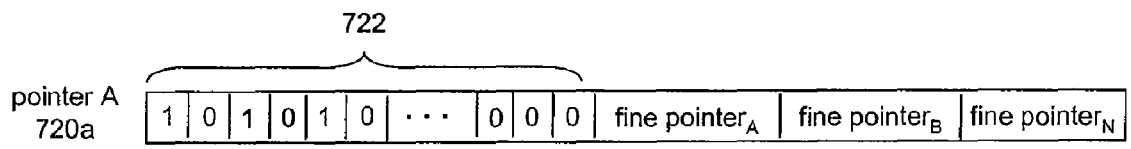
Figure 7:
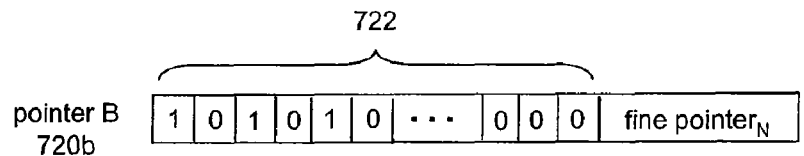

FIG. 7 depicts an exemplary configuration of a tag memory bank 700 having a single lock/unlock boundary 735 and non-contiguous locking within locked section 730, according to embodiments of the present invention. The configuration discussed in Section 3.1 required all locked blocks to be contiguous. This requirement, in effect, emulated a single lock/unlock boundary. This type of configuration is appropriate, for example, where adjacent data items are all expected to be permanently locked as each is written. The configuration depicted in FIG. 7 allows for non-contiguous locking of blocks within the "locked" section 730 of the memory bank. Such a configuration is useful, for example, where an application may need to write a mix of data items in a specific order, but where some of those data items will need to be updated (and thus their blocks cannot be locked when first written).

Tag memory bank 700 is logically divided into N blocks 712*a-n*. Each block 712 has a predetermined number of words (or bytes). As depicted in FIG. 7, memory bank 700 includes a set of contiguous unlocked blocks from the end of the last locked block to the end of the memory block. This set of contiguous unlocked blocks is referred to as the "unlocked" section 740 of memory 700. The boundary between the end of the last locked block and the "unlocked" section 740 is referred to as the primary lock/unlock boundary. The memory below that portion is referred to as the "locked" section 730 because it contains one or more locked blocks of memory.

Locked section 730 includes one or more locked portions 714 and one or more unlocked portions 716. A locked portion or an unlocked portion may be a portion of a block 712, an entire block 712, or a set of contiguous blocks 712. The unlocked portions 716 create "holes" in locked section 730.

In the exemplary configuration depicted in FIG. 7, the concatenated pointer 720 includes a linear coarse pointer 722. One advantage of locking memory using a linear pointer (rather than a log pointer) is that a single locked/unlocked boundary is not enforced—instead, users can selectively lock non-contiguous blocks of memory.

Several alternatives exist for representing fine granularity of one or more partially locked blocks. A first alternative is depicted in concatenated pointer 720a in FIG. 7. Concatenated pointer 720a includes a plurality (m) of fine pointers $726_A$, $726_B$, and $726_N$. This alternative essentially defines a plurality of lock/unlock boundaries within locked section 730. For example, the concatenation of coarse pointer 722 and fine pointer $726_A$ defines a first lock/unlock boundary; the concatenation of coarse pointer 722 and fine pointer $726_B$ defines a second lock/unlock boundary; and so on.

In this alternative, the coarse pointer indicates one or more "holes" in the protected area (i.e., some scattered blocks, below the locked/unlocked boundary, are also unlocked). In addition to the fine pointer allocated to the locked/unlocked boundary ($726_N$), additional fine pointers can be allocated to provide partial locking within one or more of these "holes."

Each fine pointer 726 is associated with one of the first m unlocked blocks 716 of memory (or one of the first m sets of contiguous unlocked blocks 716 of memory). Alternately, each fine pointer 726 is associated with one of the m highest unlocked blocks 716 (or one of the sets of contiguous unlocked blocks 716) that are at or below the primary lock/unlock boundary 735.

A second alternative defines a single lock/unlock boundary even when "holes" exist in the bitmap. This alternative is depicted in concatenated pointer 720b in FIG. 7. Concatenated pointer 720b includes a coarse pointer and a single fine pointer $726_N$. This approach will be of value in most applications because, at any given point in time, the most likely location for new data to be written is immediately after the last data written thus far. This means that this is typically the only place in memory where fine-grained protection blocks really matter, because this is where the next Write operations would waste memory when the previous Write left unused words at the end of a protection block. Thus, rather than wasting large amount of tag storage in order to store a very large linear pointer (to provide fine-grained protection at every location in the memory bank), it would be preferable to save memory and instead store a coarse/fine pointer pair, that only provides fine granularity where the next write is most likely to happen. Although not as flexible as the first alternative immediately above, this second alternative saves significant amounts of storage and tag logic, yet will fully meet the needs of the majority of anticipated applications.

In a final alternative, not depicted, multiple Gray-coded fine pointers could be implemented, one for each "coarse" block. This would be a more robust solution than the "brown-out-susceptible" traditional log pointers described in the log-linear hybrid technique. However, it is questionable whether the large total number of pointer bits needed by this approach (and the additional tag logic to manage all of these pointers) would be justified by the relatively rare use cases where separate lock/unlock control over each block is required. Further note that it would not make sense to allocate a linear (as opposed to Gray-coded) fine pointer to every block, because in this case the total number of pointer bits would be equal to a single (and simpler) linear pointer providing the same granularity of protection.

For ease of description, only an upward-moving boundary is depicted in FIG. 7. As would be appreciated by one of ordinary skill in the art, a single downward-moving boundary could be used in the present invention. The modifications to the memory configuration and to the lock operation described in FIG. 7 would be readily apparent to one of ordinary skill in the art.

Non-contiguous locking may seldom be employed, because it does not appear to be strongly motivated by known use cases, and because it will inevitably lead to fragmentation problems. Unlike the case with disk drives, RFID tags have no "file allocation table" or the equivalent that would allow a single data item to be stored in a distributed fashion into non-contiguous blocks. Therefore, any unlocked blocks "sandwiched" between locked blocks will usually incur wasted memory. Moreover, again unlike the case with disk drives, an RFID tag is unlikely to remain in the field of a reader long enough to undergo a "defragmenting" operation.

3.2.2 Lock Operation

The first alternative for representing a non-contiguous locked memory configuration (multiple fine pointers, one for each unlocked region) is a straightforward extension of the embodiments described in Section 3.1, above. The lock operation for the first alternative is thus also an extension of the embodiment described in Section 3.1.2.

Figure 8:
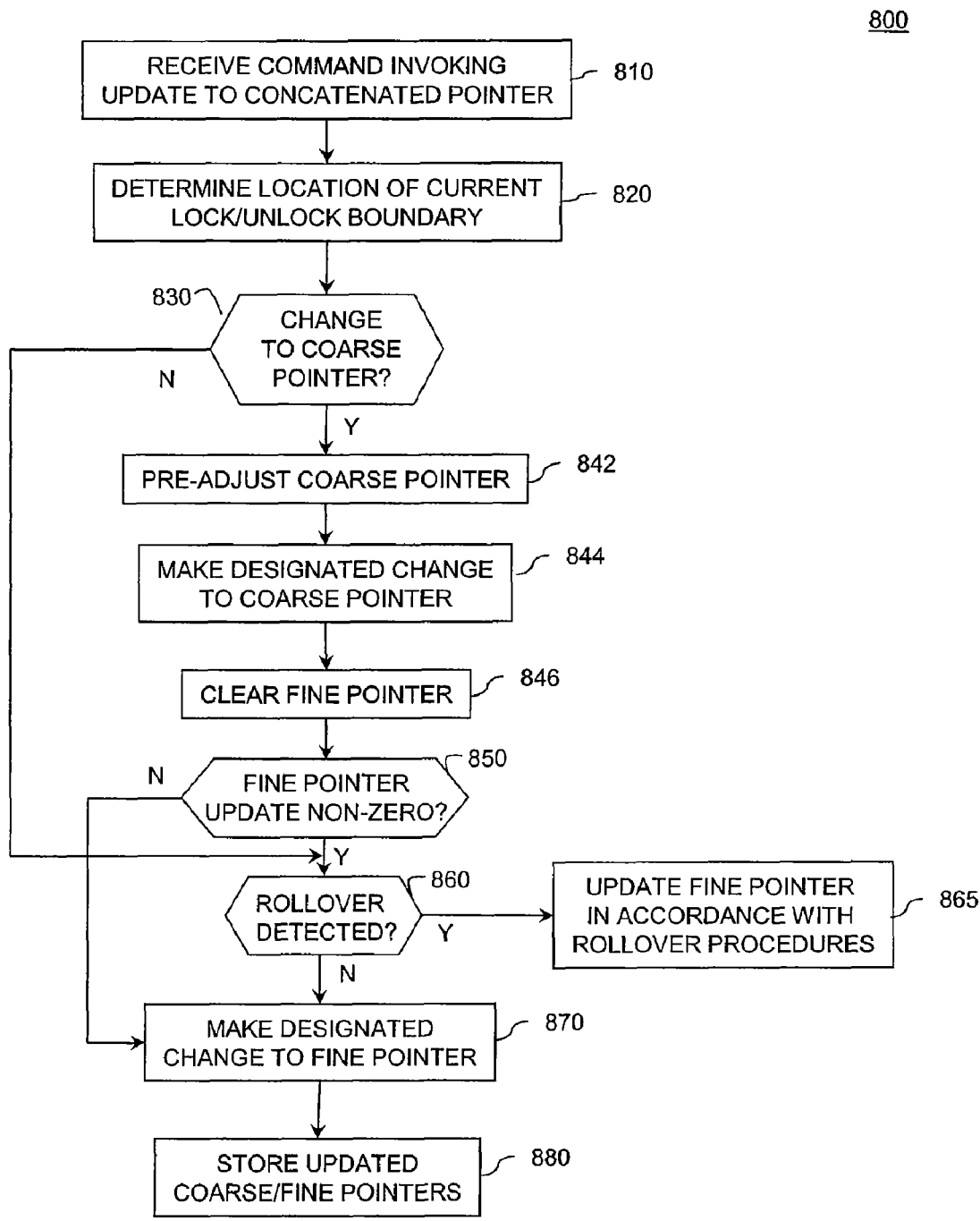
FIG. 8 depicts a flowchart of an exemplary method for updating a coarse pointer and a fine pointer in a memory configuration having non-contiguous locked blocks from the perspective of RFID tag, according to embodiments of the present invention.

The lock operation for the second alternative, defining a single locked/unlocked boundary, despite the presence of "holes" in the locked region, is described in FIG. 8. FIG. 8 depicts a flowchart 800 of an exemplary method for updating a coarse pointer and a fine pointer in a memory configuration having non-contiguous locked blocks from the perspective of RFID tag 102, according to embodiments of the present invention. Flowchart 800 is described with continued reference to the embodiments depicted in FIGS. 1 and 7. However, flowchart 800 is not limited to those embodiments. Note that some of the steps in flowchart 800 do not necessarily have to occur in the order shown.

In step 810, tag 102 receives a command invoking an update to the boundary pointer. As described above, the command may be one or more explicit lock commands or may be a write command invoking an implicit pointer update.

In step 820, tag 102 determines the location of the single lock/unlock boundary 735. In an embodiment, tag 102 searches downwards from the top of the memory bank to find the first "1" bit, and then sets the coarse boundary to be one increment above that location. For example, tag 102 may shift through the bits, starting from the rightmost (highest) bit, decrementing the boundary address for each '0' encountered, then stopping (and incrementing the address by one) after the first '1' bit is encountered. Note that the alternative method described in flowchart 600, searching upwards from the start of the bank, will not work in the non-contiguous embodiment.

In step 830, tag 102 determines whether the received command requires a change to the coarse bitmap pointer. If the command requires a change to the coarse bitmap pointer, operation proceeds to step 842. If the command does not change the current coarse pointer, then no automatic change is made to the fine pointer register and operation proceeds to step 850.

Note that flowchart 800 may also determine whether the command requests a prohibited lock operation (e.g., lowering of a previously locked boundary). As discussed above in reference to flowchart 600, if the requested operation is prohibited, tag 102 ends the lock operation and returns the appropriate response to the requesting entity (e.g., interrogator 104).

In step 842, tag 102 pre-adjusts the coarse pointer 722. For example, if the coarse boundary is about to be incremented, the bitmap bit corresponding to the old starting address for the fine pointer is set to '1' (so the former highest block, that may have been partially locked, is now completely locked). If the coarse boundary is about to be decremented (if this is permitted, as for a temporary lock command) no initial coarse pre-adjustment to the bitmap is necessary. Ideally, fine pointer $726_N$ is reset now, rather than in step 846 below, as this safely accomplishes a portion of the logical decrement of the combined address pointer at the earliest possible opportunity. If the requested change to the coarse pointer consists of creating and/or filling "holes", but without changing the coarse boundary, then no pre-adjustment is necessary.

In step 844, the designated change to the coarse pointer is made.

In step 846, the fine pointer value is cleared (set to zero).

In step 860, a determination is made whether the required change to the fine pointer will cause the value of the fine pointer to exceed a maximum values (referred to as a "rollover"). If a rollover condition is detected, operation proceeds to step 865. If a rollover condition is not detection, operation proceeds to step 870.

In step 865, the fine pointer is updated in accordance with a specified rollover procedure. Operation proceeds to step 880.

In an embodiment, the Interrogator may be responsible for handling rollover situations by commanding the appropriate changes to both the coarse and fine pointers. In that embodiment, tag 102 freezes the increment operation if the fine pointer's maximum value is reached.

In an alternate embodiment, tag 102 is responsible for handling rollover. In this embodiment, tag 102 first "tests" the sum of the fine pointer's current value and its requested increment. Tag 102 then performs an additional single increment of the coarse pointer if rollover will occur.

In step 870, the designated update to the fine pointer is made.

In step 880, the coarse pointer and fine pointer are stored in separate pointer registers.

Figure 9:
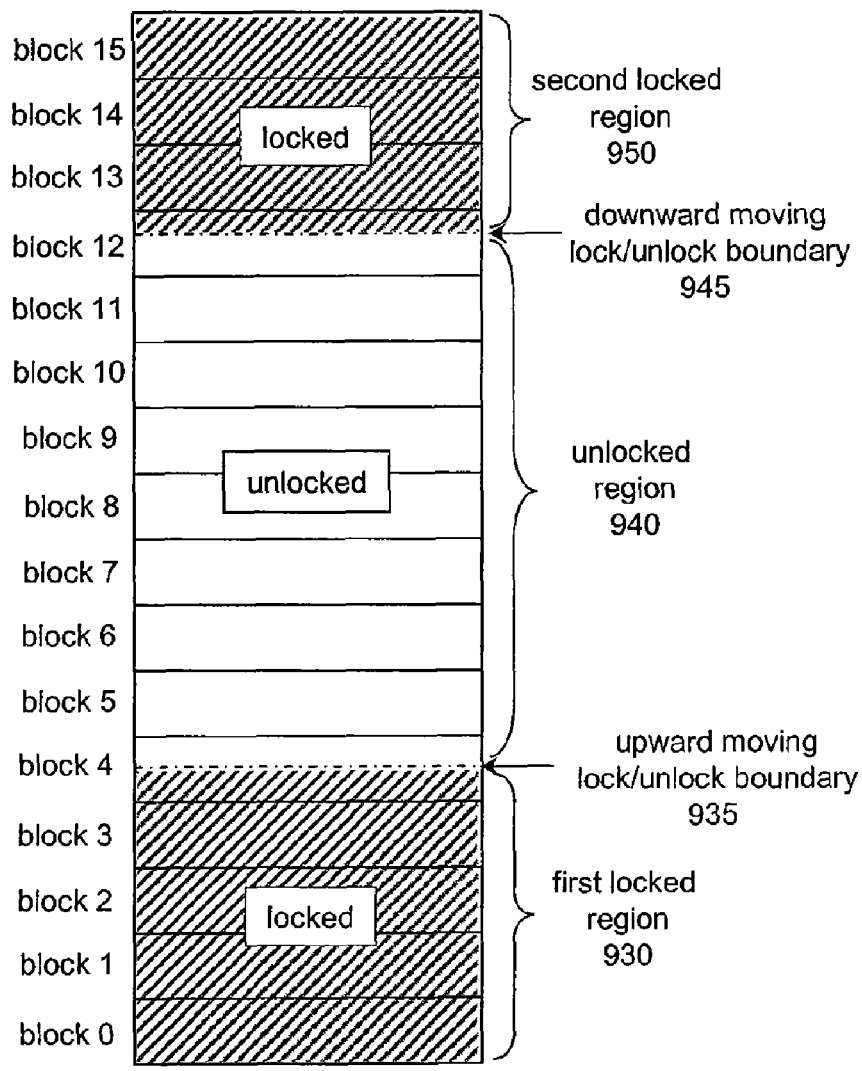
FIG. 9 depicts an exemplary configuration of a tag memory bank having a pair of lock/unlock boundaries, according to embodiments of the present invention.
Figure 9:
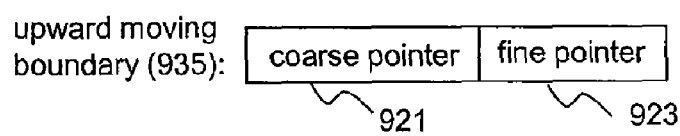
Figure 9:
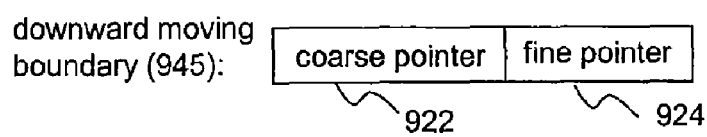

3.3 Multiple Lock/Unlock Boundaries—at Least One Contiguous Region 3.3.1 Memory Configuration In another embodiment, a pair of lock/unlock boundaries (rather than a single boundary) are supported for a given memory bank, and each of these two boundaries is managed by a separate pair of coarse/fine boundary pointers. FIG. 9 depicts an exemplary configuration of a tag memory bank 900 having a pair of lock/unlock boundaries, according to embodiments of the present invention. Memory bank 900 has two regions of protected memory. A first locked region 930 grows upwards from the lowest address. A second locked region 950 grows downwards from the highest address of the memory bank. At least one of these regions must be locked contiguously. This configuration may prove useful, for example, when a directory structure is maintained in the same bank as is the data it describes.

The first pair of coarse/fine pointers, referred to as upward-moving boundary pointer 935, indicates the location of the boundary between unlocked region 940 and first locked region 930. The second pair of coarse/fine pointers, referred to as downward-moving pointer 945 indicates the location of the boundary between the second locked region 950 and the unlocked region 940.

The second (downward-moving) pair of pointers operates similarly to the pair originally described, but with differences (due to its permitted direction of change) that would be clear to one of skill in the art. For example, the downward-moving boundary pointer is initialized to point to the highest, not lowest, address in memory, and if intended for permanent locking, only decrement operations would be allowed on the downward-moving pointer.

Upward-moving boundary pointer 935 includes a coarse pointer 921 and a fine pointer 923. Coarse pointer 921 and/or fine pointer 923 may be gray-coded pointers. Additionally, either coarse pointer 921 and/or fine pointer 923 may be linear (bitmap) pointers. Downward-moving boundary pointer 735 includes a coarse pointer 922 and a fine pointer 924. Coarse pointer 922 and/or fine pointer 924 may be gray-coded pointers. Additionally, either coarse pointer 922 and/or fine pointer 924 may be linear (bitmap) pointers. If a linear coarse pointer 921 or 922 is used, the same single linear coarse pointer can serve as the coarse pointer to both the upward-moving and downward-moving boundaries of the memory bank.

If a linear coarse pointer is used, the "coarse boundary" of the upward-growing locked/unlocked boundary 935 is considered to be the first (lowest) un-locked block above the last (highest) block of first protection region 930 that is completely locked (as indicated by a '1' bit in the linear coarse pointer). The upward-growing coarse boundary is therefore represented in the "upward" linear coarse pointer as the '0' bit that is immediately to the right of the rightmost '1' bit in the pointer. In an alternative embodiment, the "coarse boundary" of the upward-growing boundary is considered to be the last (highest) block that is completely or partially locked (as indicated by the rightmost '1' bit in the linear coarse pointer), rather than the first (lowest) un-locked block above the last (highest) block that is completely locked.

The convention for a downward-moving boundary, under either alternative for the convention, is parallel to that for the upward-moving boundary (with the identical correspondence between bit positions and block positions in memory), with the obvious substitutions of "highest" for "lowest" and so forth, as will be obvious to one of ordinary skill. For example, when describing a downward-moving locked/unlocked boundary, the "coarse boundary" is considered to be the first (highest) un-locked block below the last (lowest) block that is completely locked (as indicated by a '1' bit in the linear coarse pointer). This first unlocked block's address is the base address that the fine pointer is added to, as described above, to form the full address of the first un-locked word of memory below the boundary.

The downward-moving pair of pointers could be managed by a second command that mirrors the command for the upward-growing pointers described above, or alternately a more complex command could be defined that can change both sets of pointers with a single air-interface command. As another alternative, both pointers could be automatically managed at the time of each write operation. Furthermore, a custom command can be defined that automatically writes to (and then optionally locks) both regions of memory in response to a single air interface command (for example, to add both a data object and its corresponding directory entry in a single operation). An additional feature of note in this embodiment is that the tag's logic is now responsible for ensuring that subsequent protected memory operations target only the region in between the two boundaries.

3.3.2 Lock Operation

The main challenge from adding a second region of protection is determining the relative extents of the upward- and downward-growing regions, in order to determine the current base addresses for the two fine pointers (in a way that is easy for the tag logic to calculate, without a need to store extra results that can become inconsistent due to a power loss). In this application, given the a priori restriction that at least one of the two regions must consist of contiguous blocks (with no "holes), the embodiment is a straightforward extension of previously-described techniques.

Figure 10:
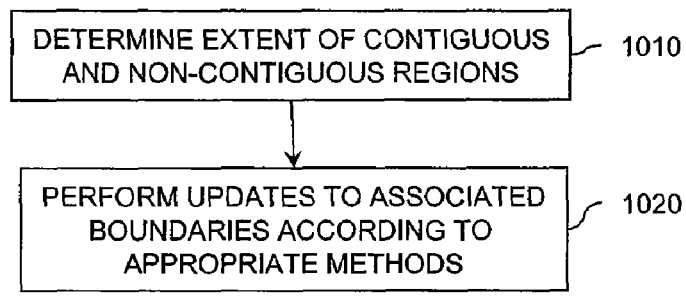
FIG. 10 depicts a flowchart of an exemplary method for updating an upward-moving boundary pointer and a downward-moving boundary pointer, according to embodiments of the present invention.

FIG. 10 depicts a flowchart 1000 of an exemplary method for updating an upward-moving boundary pointer and a downward-moving boundary pointer, according to embodiments of the present invention. Flowchart 1000 is described with continued reference to the embodiments of FIGS. 1 and 9. However, flowchart 1000 is not limited to these embodiments.

In step 1010, the extent of the contiguous region (or regions) and optionally the extent of the non-contiguous region are determined. For example, assume that only the lower region is allowed to be non-contiguous. If so, tag 102 determines the extent of the contiguous region first, in this example by searching "downward" (right to left) from the rightmost bit of the linear pointer (which represents the topmost block of the bank) until it finds a '0' bit. By definition, this block is the downward-moving coarse boundary. The tag logic can then continue searching (still right to left) through the bitmap until it finds the next '1' bit. The '0' bit immediately to the right of this '1' bit represents the upward-moving coarse boundary. The presence of "holes" in the lower (upward-growing) region has no effect.

In step 1020, tag 102 performs updates to the upward-moving boundary and the downward-moving boundary according to the appropriate method described above. For example, if the upward-moving or downward-moving boundary is associated with a non-contiguously locked region, the method described in Section 3.2.2 is used to update the boundary pointer. If the upward-moving and/or downward-moving boundary is associated with a contiguously locked region, the method described in Section 3.1.2 is used to update the boundary pointer.

3.4 Multiple Lock/Unlock Boundaries—Non-Contiguous Locking

3.4.1 Memory Configuration

In another embodiment, two protection regions are supported (one growing upward and one growing downward), both of which may be noncontiguous. Because neither region can be relied on as being contiguous, the lock algorithms described above are not sufficient. To understand the problem, consider a bitmap pointer whose current state consists entirely of alternating '1' and '0' bits—such a pointer does not contain any inherent clues as to the boundary between the upward- and downward-growing regions. Moreover, the very intent of dual-region applications (such as for data and directory) is that there is not a fixed a priori relationship between the relative sizes of the two regions. For example, a tag may hold a few large data items (and thus its directory region will be much smaller than its data region), or it may hold many small data items (in which case the converse may be true). Thus, defining a fixed a priori boundary between the two regions (such as the midpoint of the memory bank), while solving the boundary-determination problem, would poorly serve the requirements of the intended application.

Figure 11:
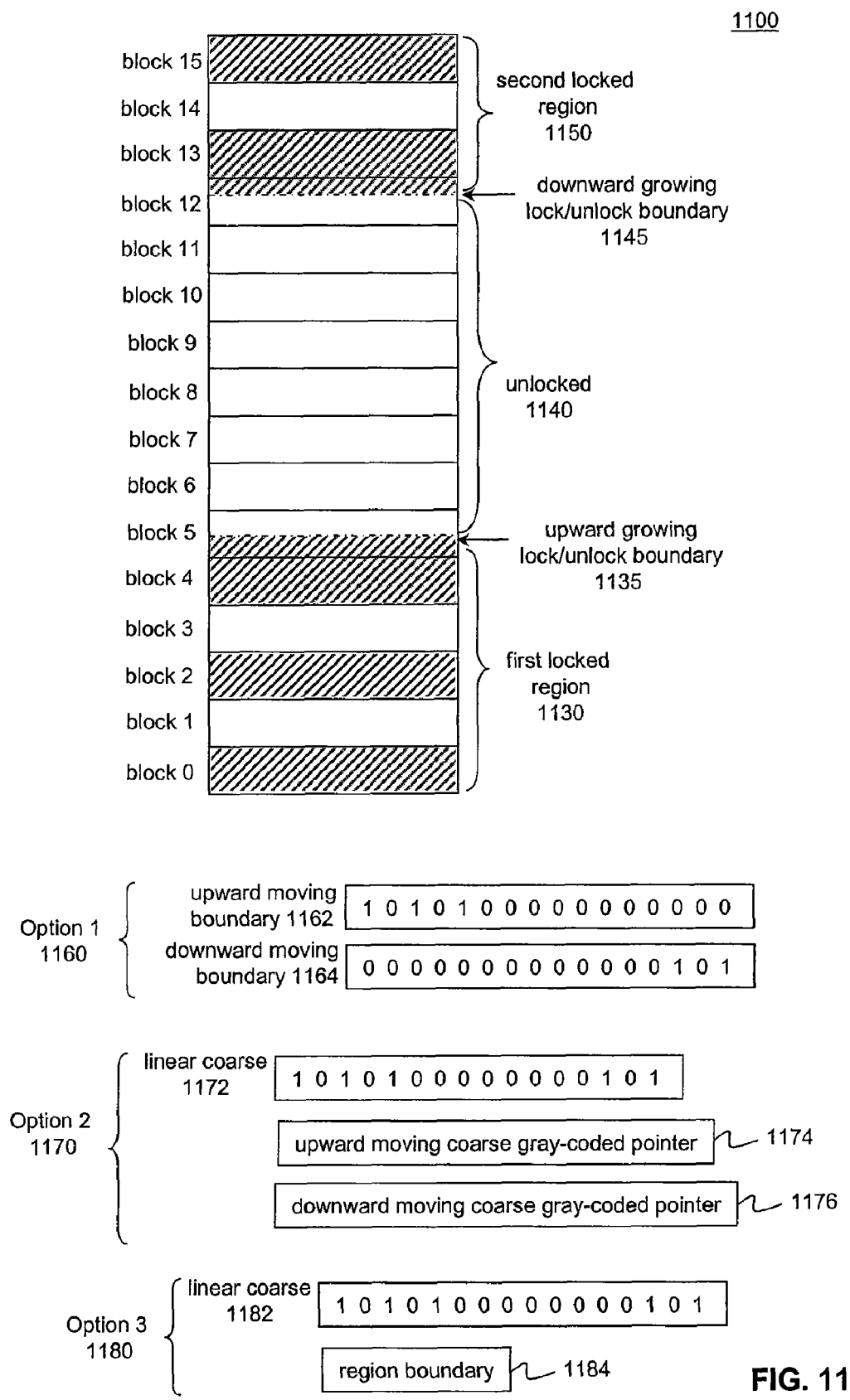
FIG. 11 depicts an exemplary configuration of a tag memory bank having two protection regions with non-contiguous locking, according to embodiments of the present invention.

FIG. 11 depicts an exemplary configuration of a tag memory bank 1100 having two protection regions with non-contiguous locking, according to embodiments of the present invention. Memory bank 1100 includes a first protection region 1130 growing upwards from the lowest memory address and a second protection region 1150 growing downwards from the highest memory address. Configuration 1100 includes a downward-moving boundary pointer 1145 and an upward-moving boundary pointer 1135.

Multiple alternatives exist for determining the boundaries between the multiple non-contiguous protection regions depicted in FIG. 11. The first alternative is illustrated as option 1 (1160) in FIG. 11. Option 1 (1160) uses two coarse pointers instead of one. A first coarse pointer 1162 is a linear (bitmap) pointer for the low region that grows upwards. A second coarse pointer 1164 is a linear (bitmap) pointer for the downward-growing region. The final map of locked and unlocked block would be the union of these two pointers.

In this alternative, the process for searching for a boundary is performed separately for each boundary, one coarse pointer at a time, using the technique previously described. Specifically, for each pointer, tag 102 searches from the "opposite" end of memory (relative to the start of the target region) until it finds the first locked block, and then "backs off" by one block in order to determine the coarse boundary for that region. This solution is conceptually simple, but doubles the coarse-pointer storage requirements compared to the second alternative, described below. Moreover, this solution is somewhat incompatible with a linear pointer intended to represent the locked/unlocked status of both the data and optional directory regions in the same pointer register and to control both regions by a single update to one pointer register.

The second alternative is illustrated as option 2 (1170) in FIG. 11. The second alternative reduces the extra pointer storage to some extent (the reduction is dependent on the size of the coarse pointer). Option 2 (1170) uses one linear coarse pointer 1172 as before, but adds two explicit Gray-coded coarse-boundary pointers 1174, 1176 to explicitly indicate the two locked/unlocked boundaries. These added pointers require a total of $2*\log_2(n)$ bits, compared to 'n' bits for a second linear pointer. The savings over a second linear pointer grows significantly for values of n greater than 8 blocks. An unprogrammed tag has its two boundary pointers initially set to the lowest and highest blocks of the memory bank.

These two-explicit gray-coded coarse-boundary pointers must be maintained by the Interrogator, in tandem with every change to the coarse pointer bitmap. Although this approach adds complexity to the Interrogator commands, it simplifies the tag logic, in that no on-the-fly coarse boundary calculations are required. However, since the Interrogator has to issue at least two separate pointer updates for every protection change (to the coarse bitmap, and to at least one of the two boundary pointers), the possibility exists for the pointer changes to lose synchronization if power is lost partway through the sequence (this problem can occur, whether the sequence is invoked through separate air interface commands or a single complex command). The preferred solution for this problem is for the boundary pointer(s) to be updated first, followed by the coarse bitmap pointer. This way, if power is lost in between, the tag logic can at least reliably detect the fault (because the block at the boundary wasn't locked as expected), and can repair it by locking all the blocks up to the boundary (at the possible cost of needing to lock some blocks that were intended to be unlocked).

A third alternative is illustrated as option 3 (1180) in FIG. 11. This alternative reduces storage requirements still further, and avoids the need for the Interrogator to maintain additional pointers, thus avoiding the synchronization problem. Option 3 (1180) uses one linear coarse pointer 1182, and adds a "region boundary" pointer 1184 (preferably Gray-coded, which requires only $\log_2(n)$ bits compared to 'n' bits for a second linear pointer). An unprogrammed tag has its region pointer initially set to the midpoint of the (empty) memory bank. This "region boundary" pointer 1184 (readable but not writeable by Interrogators) is automatically recalculated by tag logic and stored (in nonvolatile storage) every time the tag is commanded (directly or indirectly) to update either or both of the locked/unlocked boundaries. The recalculated "region boundary" is always the midpoint (rounding down) between the two locked/unlocked coarse boundaries, as they will be after the coarse pointer update. This recalculation algorithm automatically adapts to the varying size ratio between the two regions. The locked/unlocked boundaries of each region, even though both regions may be noncontiguous, can be easily calculated by the tag simply by search leftwards and rightwards from the currently-stored "region boundary" until the first '1' bit is found in each direction (then "backing off" as previously described).

2.4.2 Lock Operation—Region Boundary Alternative

Figure 12:
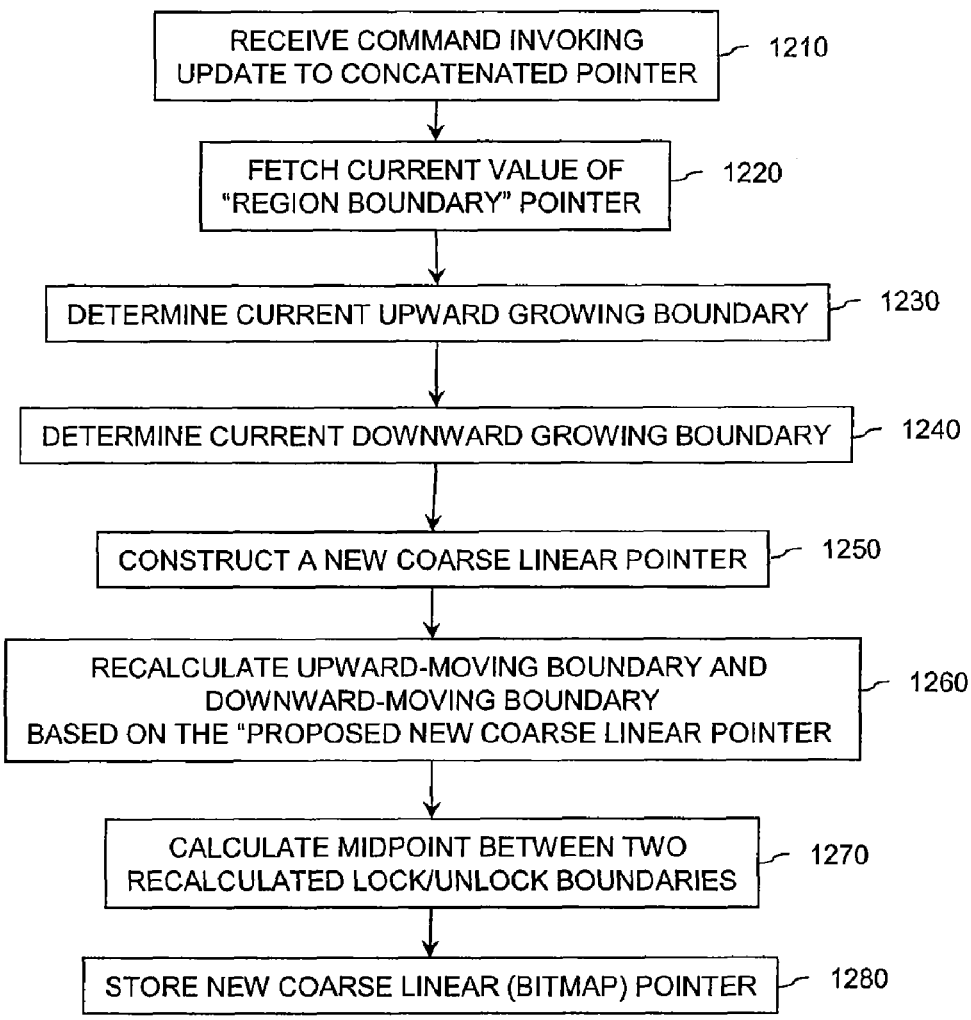
FIG. 12 depicts a flowchart of an exemplary method for determining multiple lock/unlock boundaries in a memory having multiple non-contiguously locked protection regions, according to embodiments of the present invention.

FIG. 12 depicts a flowchart 1200 of an exemplary method for determining multiple lock/unlock boundaries in a memory having multiple non-contiguously locked protection regions, according to embodiments of the present invention. Flowchart 1200 is described with continued reference to FIGS. 1 and 11. However, flowchart 1200 is not limited to these embodiments. Note that some of the steps of flowchart 1200 do not necessarily have to occur in the order shown.

In step 1210, tag 102 receives a command invoking an update to the one or more of the boundary pointers of a memory bank of tag 102. As described above, the command may be one or more explicit lock commands or may be write command invoking an implicit pointer update.

In step 1220, tag 102 fetches the current value of the "region boundary" pointer 1184.

In step 1230, tag 102 searches the current (not yet modified) coarse linear bitmap pointer 1182, looking to the left of the bitmap position indicated by the current "region boundary" pointer 1184 until it finds a '1' bit, then backs off by one, to determine (and save in interim memory) the current locked/unlocked coarse boundary of the lower (upward-growing) region 1130.

In step 1240, tag searches to the right of the bitmap position indicated by the "region boundary" pointer 1184 until it finds a '1' bit, then backs off by one, to determine (and save in interim memory) the current locked/unlocked coarse boundary of the upper (downward-growing) region 1150.

In step 1250, tag 102 constructs a new coarse linear (bitmap) pointer in interim memory, including the changes due to the command received in step 1210.

In step 1260, tag 102 recalculates the upward-moving boundary 1135 and the downward-moving boundary 1145 based on the "proposed" new coarse linear (bitmap) pointer.

It is theoretically possible to lock so many new bits at once in one of the two protected regions (but not the other) as to expand the region past the old "region boundary," with the result that the new bitmap would no longer be correctly interpreted in this step. In the case of a reversible pointer, asymmetrical unlocking of too many bits can cause the same difficulty. In an embodiment, the Interrogator is responsible for ensuring that this does not occur. If the condition would occur (due to a command with a disproportionate number of newly-changed bits in one region vs. the other), then the Interrogator can resolve the problem by distributing the protection change over two or more separate commands (which will gradually and unambiguously move the "region boundary" to the desired position).

In step 1270, tag 102 calculates the midpoint between the two recalculated lock/unlock boundaries and stores this midpoint into nonvolatile memory as the new value of the "region boundary" pointer 1184.

In step 1280, tag 102 stores the new coarse linear (bitmap) pointer into nonvolatile memory. The associated fine pointers (e.g., one per coarse pointer) are also updated in this step as necessary.

Power loss during this multi-stage operation will not result in a corrupted pointer if the exemplary method of FIG. 12 is executed whenever any write or lock command is going to change the coarse pointer. Provided the Interrogator updates the linear pointer in multiple steps, if necessary, inconsistency between the "region boundary" pointer and the coarse pointer, should a power loss occur in between steps 1270 and 1280, is not a problem. Note that steps 1270 and 1280 can be performed in the opposite order. Once the tag regains power after the loss, either the "old" bitmap or the "new" bitmap can always be correctly interpreted using either the old or the new value of the "region boundary" pointer.

4.0 Methods for Prohibiting Operations

Figure 13:
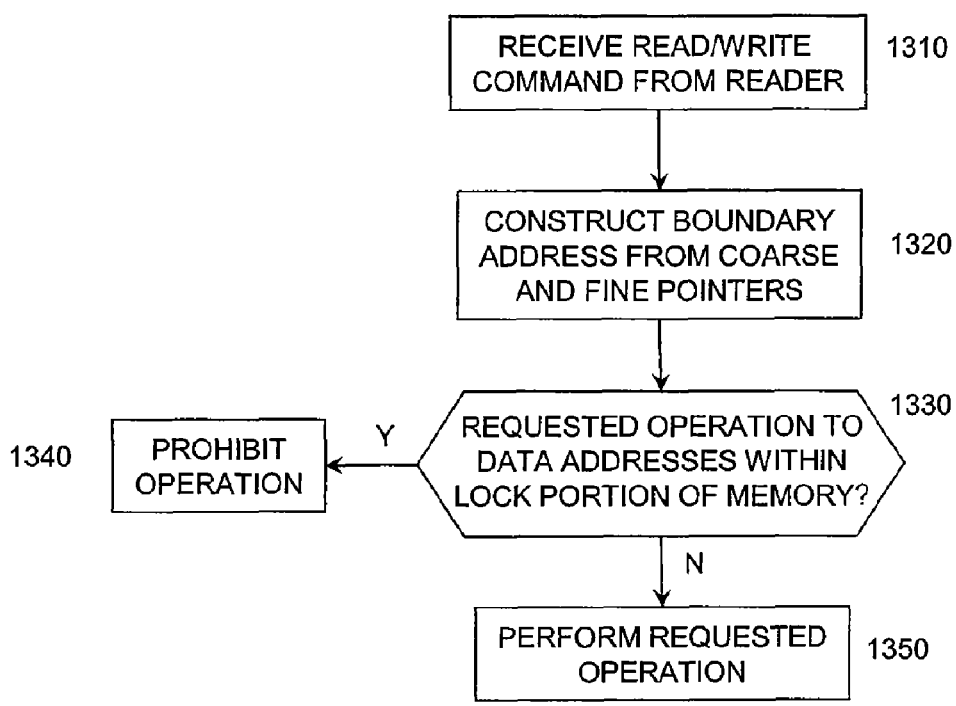
FIG. 13 depicts a flowchart of an exemplary method for prohibiting operations using concatenated boundary pointers, according to embodiments of the present invention.

FIG. 13 depicts a flowchart 1300 of an exemplary method for prohibiting operations using concatenated boundary pointers, according to embodiments of the present invention. Flowchart 1300 is described with continued reference to the embodiments depicted in FIGS. 1, 5, 7, 9, and 11. However, flowchart 1300 is not limited to those embodiments. Note that the steps of flowchart 1300 do not necessarily have to occur in the order shown.

In step 1310, a read or write command is received by tag 102.

In step 1320, tag 102 constructs one or more complete boundary address from the values of the coarse pointer(s) and fine pointer(s) stored in the pointer registers. For example, suppose an 'n' bit address is represented by two Gray-coded pointers: a coarse pointer of 'c' bits and a fine pointer of 'f' bits (where c+f=n). The complete address may be obtained by converting each component pointer from Gray-coded to standard values, then left-shifting the coarse value by 'f' and adding the fine value to it. Since this full address is calculated but never stored in nonvolatile tag memory, power loss has no long-term consequences.

In step 1330, tag 102 determines whether the requested operation is to data addresses within a locked portion of the memory bank. For example, tag 102 may determine whether the requested operation is to a data address below the lock/unlock boundary in a single boundary contiguous locking memory configuration. If the operation is to a data address within a locked portion of memory, operation proceeds to step 1340 and tag 102 prohibits the requested operation. If the operation is not to a prohibited address, operation proceeds to step 1350 and tag 102 performs the requested operation.

4. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) tag, comprising:
an antenna;
a memory having a locked portion and an unlocked portion, wherein a boundary between the locked portion and the unlocked portion is identified by a coarse pointer concatenated with a fine pointer, wherein the fine pointer is a gray-coded pointer;
a first register storing the coarse pointer; and
a second register storing the fine pointer.

2. The RFID tag of claim 1, wherein the coarse pointer is a linear pointer.

3. The RFID tag of claim 1, wherein the coarse pointer is a gray-coded pointer.

4. The RFID tag of claim 1, further comprising:
control logic configured to update the boundary.

5. A radio frequency identification (RFID) tag, comprising:
an antenna;
a memory having a locked portion and an unlocked portion, wherein a boundary between the locked portion and the unlocked portion is identified by a coarse pointer concatenated with a fine pointer, wherein the fine pointer is a linear pointer;
a first register storing the coarse pointer; and
a second register storing the fine pointer.

6. The RFID tag of claim 5, wherein the coarse pointer is a linear pointer.

7. The RFID tag of claim 5, wherein the coarse pointer is a gray-coded pointer.

8. The RFID tag of claim 1, further comprising:
control logic configured to update the boundary.

* * * * *